United States Patent
Qi et al.

(10) Patent No.: US 11,844,041 B2
(45) Date of Patent: Dec. 12, 2023

(54) METHOD AND APPARATUS FOR FINGERPRINTING POSITIONING

(71) Applicant: Telefonaktiebolaget LM Ericsson (publ), Stockholm (SE)

(72) Inventors: Kunpeng Qi, Shanghai (CN); Di Shu, Shanghai (CN); Thomas Johansson, Åby (SE); Åke Busin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/056,101

(22) PCT Filed: Nov. 12, 2018

(86) PCT No.: PCT/CN2018/115009
§ 371 (c)(1),
(2) Date: Nov. 17, 2020

(87) PCT Pub. No.: WO2020/097752
PCT Pub. Date: May 22, 2020

(65) Prior Publication Data
US 2021/0212012 A1 Jul. 8, 2021

(51) Int. Cl.
*H04W 64/00* (2009.01)
*H04W 24/10* (2009.01)

(52) U.S. Cl.
CPC ......... *H04W 64/00* (2013.01); *H04W 24/10* (2013.01)

(58) Field of Classification Search
CPC .............................. H04W 64/00; H04W 24/10
See application file for complete search history.

(56) References Cited

U.S. PATENT DOCUMENTS

| | | | | |
|---|---|---|---|---|
| 2012/0184290 | A1* | 7/2012 | Kazmi | G01S 5/10 455/456.1 |
| 2014/0038639 | A1* | 2/2014 | Shi | G01S 5/0252 455/456.1 |
| 2014/0295871 | A1* | 10/2014 | Ahn | H04W 24/10 455/452.1 |

(Continued)

FOREIGN PATENT DOCUMENTS

| | | |
|---|---|---|
| CN | 102958091 A | 3/2013 |
| CN | 103314613 A | 9/2013 |

(Continued)

OTHER PUBLICATIONS

International Search Report and Written Opinion of the International Searching Authority for PCT International Application No. PCT/CN2018/115009 dated Aug. 9, 2019.

(Continued)

*Primary Examiner* — Umair Ahsan
(74) *Attorney, Agent, or Firm* — Christopher & Weisberg, P.A.

(57) ABSTRACT

A method implemented at a location server is proposed. The method comprises: deciding inter-frequency measurement information for positioning a user equipment, UE, wherein the inter-frequency measurement information comprises at least one frequency other than a frequency of a serving cell of the UE; sending a first measurement request containing the inter-frequency measurement information to an access node of the serving cell; receiving a first measurement result from the access node; and determining a position of the UE based on the measurement result.

8 Claims, 7 Drawing Sheets

(56) References Cited

U.S. PATENT DOCUMENTS

| | | | |
|---|---|---|---|
| 2015/0050939 A1* | 2/2015 | Futaki | H04W 24/10 |
| | | | 455/452.1 |
| 2018/0054795 A1* | 2/2018 | Edge | H04W 4/02 |
| 2018/0109984 A1 | 4/2018 | Wu | |

FOREIGN PATENT DOCUMENTS

| | | |
|---|---|---|
| CN | 104980949 A | 10/2015 |
| EP | 2736284 A1 | 5/2014 |
| EP | 2943010 A1 | 11/2015 |
| WO | 2018082509 A1 | 5/2018 |

OTHER PUBLICATIONS

Kemppi et al., "Database Correlation Method for Multi-System Positioning," Proceedings of the 2006 IEEE 63rd Vehicular Technology Conference; Melbourne, Australia. May 7-10, 2006; pp. 866-870.

Mondal et al., "An Efficient Grid-based RF Fingerprint Positioning Algorithm for User Location Estimation in Heterogeneous Small Cell Networks," International Conference on Localization and GNSS 2014 (ICL-GNSS 2014), Helsinki, 2014, pp. 1-5.

Milioris et al., "Low-dimensional signal-strength fingerprint-based positioning in wireless LANs," Ad Hoc Networks, vol. 12, Jan. 2014, pp. 100-114.

Mondal et al., "Performance Evaluation of MDT Assisted LTE RF Fingerprint Framework," 2014 Seventh International Conference on Mobile Computing and Ubiquitous Networking (ICMU), Singapore, 2014, pp. 33-37.

* cited by examiner

METHOD AND APPARATUS FOR FINGERPRINTING POSITIONING

CROSS REFERENCE TO RELATED APPLICATION

This application is a 35 U.S.C. § 371 national stage application of PCT International Application No. PCT/CN2018/115009 filed on Nov. 12, 2018, the disclosure and content of which is incorporated by reference herein in its entirety.

FIELD OF THE INVENTION

The present disclosure generally relates to communication networks, and more specifically, to a location server and an access node in a communication network as well as methods thereof.

BACKGROUND

This section introduces aspects that may facilitate a better understanding of the disclosure. Accordingly, the statements of this section are to be read in this light and are not to be understood as admissions about what is in the prior art or what is not in the prior art.

Among various positioning technologies for a user equipment (UE) in a communication network, fingerprinting positioning technology, which is also known as RF pattern matching, is now widely used in the market and is discussed in 3GPP standardization.

However, there are some technical limitations in existing solutions of fingerprinting positioning.

In radio access network (RAN), on one hand, when asking the UE to report the neighboring cell measurements, either actively or in response to a request from a location server, the RAN only requests intra-frequency measurements considering high system cost of inter-frequency measurements. Only requesting intra-frequency measurements of neighboring cells for positioning limits the location accuracy that might be achieved. On the other hand, when asking the UE to report the neighboring cell measurements, the RAN requests intra-frequency measurements and partly or all inter-frequency measurements as a result of pure RAN decision for non-positioning purpose.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution of inter-frequency measurements handling in fingerprinting positioning method that improves the positioning accuracy in a system efficient fashion.

According to a first aspect of the present disclosure, there is provided a method implemented at a location server, which comprises: deciding inter-frequency measurement information for positioning a user equipment, UE, wherein the inter-frequency measurement information comprises at least one frequency other than a frequency of a serving cell of the UE; sending a first measurement request containing the inter-frequency measurement information to an access node of the serving cell; receiving a first measurement result from the access node; and determining a position of the UE based on the measurement result.

In accordance with an exemplary embodiment, the inter-frequency measurement information further comprises a number of the at least one frequency and/or a number of neighboring cells of each of the at least one frequency.

In accordance with an exemplary embodiment, the inter-frequency measurement information further comprises a first indication indicating that measurements should be collected based on non-positioning event or a second indication indicating that measurements should be collected based on positioning request.

In accordance with an exemplary embodiment, the method further comprises: receiving a location request containing an identifier of the serving cell from a mobility management node; retrieving a first set of frequencies associated with the serving cell from a location database; wherein the deciding inter-frequency measurement information step comprises: selecting some or all of the first set of frequencies as the at least one frequency.

In accordance with an exemplary embodiment, the method further comprises: sending a measurement request for the frequency of the serving cell to the access node; receiving a second measurement result from the access node; determining a preliminary position of the UE based on the second measurement result; retrieving a second set of frequencies associated with the preliminary position from a location database; wherein the deciding inter-frequency measurement information step comprises: selecting some or all of the second set of frequencies as the at least one frequency.

In accordance with an exemplary embodiment, the selecting step is performed based on operator configuration, UE's capability to support multi radio frequency, positioning accuracy requirement, or appearance probabilities of the frequencies in the serving cell.

In accordance with an exemplary embodiment, the determining a position of the UE based on the measurement result comprises: calculating similarities between measurements in the first measurement result and corresponding signatures recorded in a location database; determining the position of the UE based on the calculated similarities.

In accordance with an exemplary embodiment, the first measurement result comprises measurements for some or all of the at least one frequency, and the measurements are marked with cell of the frequency and/or a third indication indicating whether the measurements are collected based on non-positioning event or the measurements are collected based on positioning request.

In accordance with an exemplary embodiment, the first measurement request comprises a LPPa E-CID (Enhanced Cell-ID) Measurement Initiation Request or a NRPPa E-CID Measurement Initiation Request.

According to a second aspect of the present disclosure, there is provided a method implemented at an access node, which comprises: receiving a first measurement request containing an inter-frequency measurement information for positioning a user equipment, UE, from a location server, wherein the inter-frequency measurement information comprises at least one frequency other than a frequency of a serving cell of the UE; sending a first measurement message to the UE; receiving a first measurement report from the UE; and sending a first measurement result based on the first measurement report to the location server.

In accordance with an exemplary embodiment, the inter-frequency measurement information further comprises a number of the at least one frequency.

In accordance with an exemplary embodiment, the inter-frequency measurement information further comprises a number of neighboring cells of each of the at least one frequency.

In accordance with an exemplary embodiment, the inter-frequency measurement information further comprises a first indication indicating that measurements should be collected based on non-positioning event or a second indication indicating that measurements should be collected based on positioning request.

In accordance with an exemplary embodiment, the first measurement result comprises measurements for some or all of the at least one frequency, and the measurements are marked with cell of the frequency and/or a third indication indicating whether the measurements are collected based on non-positioning event or the measurements are collected based on positioning request.

In accordance with an exemplary embodiment, the method further comprises: after receiving the first measurement request, selecting some or all of the at least one frequency based on network status and UE status; and wherein the first measurement message contains the selected frequencies.

In accordance with an exemplary embodiment, the method further comprises: after receiving the first measurement report from the UE, when a number of neighboring cells associated with the first measurement report is less than the corresponding number of neighboring cells contained in the inter-frequency measurement information, sending a second measurement message to the UE, wherein the second measurement message contains some of the at least one frequency that are different from those contained in the first measurement message; receiving a second measurement report from the UE; wherein the first measurement result is also based on the second measurement report.

In accordance with an exemplary embodiment, the method further comprises: after receiving the first measurement report from the UE, when a number of neighboring cells associated with the first measurement report is less than the corresponding number of neighboring cells contained in the inter-frequency measurement information and the UE reports measurements periodically, receiving a third measurement report from the UE, wherein the third measurement report contains some of the at least one frequency that are different from those contained in the first measurement message; sending a third measurement result based on the third measurement report to the location server.

According to a third aspect of the present disclosure, there is provided an apparatus implemented in a location server, which comprises: one or more processors; and one or more memories comprising computer program codes, the one or more memories and the computer program codes configured to, with the one or more processors, cause the apparatus at least to: decide inter-frequency measurement information for positioning a user equipment, UE, wherein the inter-frequency measurement information comprises at least one frequency other than a frequency of a serving cell of the UE; send a first measurement request containing the inter-frequency measurement information to an access node of the serving cell; receive a first measurement result from the access node; and determine a position of the UE based on the measurement result.

According to a forth aspect of the present disclosure, there is provided an apparatus implemented in an access node, which comprises: one or more processors; and one or more memories comprising computer program codes, the one or more memories and the computer program codes configured to, with the one or more processors, cause the apparatus at least to: receive a first measurement request containing an inter-frequency measurement information for positioning a user equipment, UE, from a location server, wherein the inter-frequency measurement information comprises at least one frequency other than a frequency of a serving cell of the UE; send a first measurement message to the UE; receive a first measurement report from the UE; and send a first measurement result based on the first measurement report to the location server.

According to a fifth aspect of the present disclosure, there is provided a computer-readable medium having computer program codes embodied thereon which, when executed on a computer, cause the computer to perform any step of the method according to the first aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

According to a seventh aspect of the present disclosure, there is provided an apparatus implemented in a location server, which comprises: a deciding unit configured to decide inter-frequency measurement information for positioning a user equipment, UE, wherein the inter-frequency measurement information comprises at least one frequency other than a frequency of a serving cell of the UE; a sending unit configured to send a first measurement request containing the inter-frequency measurement information to an access node of the serving cell; a receiving unit configured to receive a first measurement result from the access node; and a determining unit configured to determine a position of the UE based on the measurement result.

According to an eighth aspect of the present disclosure, there is provided an apparatus implemented in an access node, which comprises: a request receiving unit configured to receive a first measurement request containing an inter-frequency measurement information for positioning a user equipment, UE, from a location server, wherein the inter-frequency measurement information comprises at least one frequency other than a frequency of a serving cell of the UE; a message sending unit configured to send a first measurement message to the UE; a report receiving unit configured to receive a first measurement report from the UE; and a result sending unit configured to send a first measurement result based on the first measurement report to the location server.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
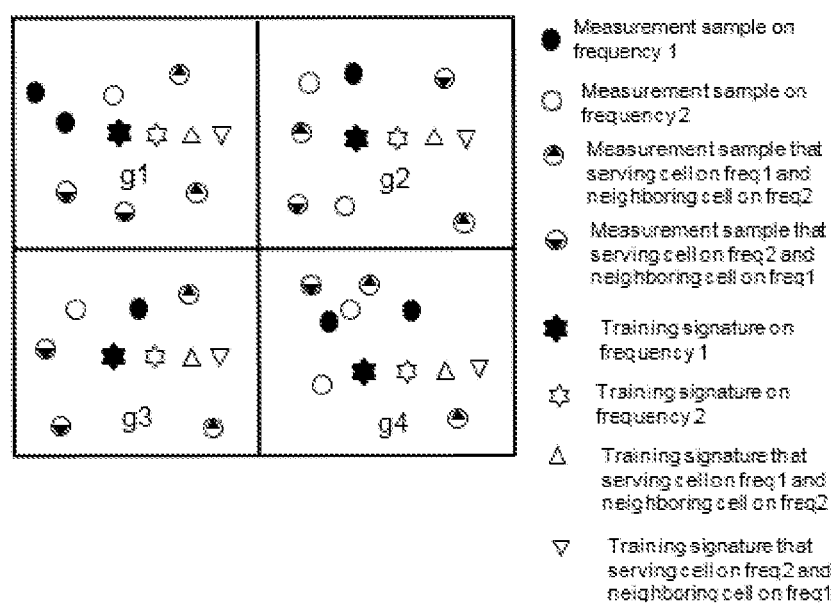
FIG. 1 is a diagram illustrating an example of measurement samples and training signatures.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network device" refers to a radio device in a communication network via which a terminal device accesses to the network and receives services therefrom. The network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network device may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to employ multi-antenna technology in a wireless communication network such as a 4G/5G network. Multi-antenna technology brings significant improvements in system performance and energy efficiency by focusing the transmission and reception of signal energy into ever-smaller regions of space. Basically, the more antennas the transmitter/receiver is equipped with, the more the possible signal paths and the better the performance in terms of data rate and link reliability.

Through the use of a large number of service antennas (e.g., hundreds or thousands) which are operated fully coherently and adaptively, the multi-antenna technology such as massive multiple-input multiple-output (MIMO) can bring prominent improvements in data throughput and energy efficiency, particularly when MIMO is combined with simultaneous scheduling of a large number of user terminals (e.g., tens or hundreds). In general, MIMO can be used for the time division duplex (TDD) operation, but it may also be potentially applied in the frequency division duplex (FDD) operation.

Currently, in a location server, the inter-frequency measurements are not requested and cannot be used in an optimal way to achieve a good accuracy and to balance the system efficiency. Besides, there are no fields in current interfaces between the location server and the RAN to negotiate the reporting of inter-frequency measurements.

The fingerprinting positioning method will be described. The principle of fingerprinting positioning is as follows. A UE makes measurements, for example, measures the signal strength, from base stations and reports to the network. The measurements of the UE are compared with the signatures in a location database. Signatures are created from historical measurements and are associated with true locations. If a matching signature can be found, the location associated with the signature is deemed as the location of the UE.

In the present invention, measurements include: 1) measurements from the serving cell; 2) intra-frequency measurements, that is, measurements from intra-frequency neighboring cells that share the same frequency as that of the serving cell; 3) inter-frequency measurements, that is, measurements from inter-frequency neighboring cells that are on a different frequency from that of the serving cell.

The basis for fingerprinting positioning is to create a location database of signatures generated from historical measurements. As to the present invention, both intra-frequency measurements and inter-frequency measurements are collected. The "area of interest" is divided into a regular tessellation of N square grid units. The signatures are called training signatures or reference signatures. The samples in one grid may form several signatures. For example, several carries are deployed in the radio network system, the samples in one grid belong to different carries, samples of each carrier in this grid unit form one fingerprint training signature.

For generating signatures, the measurement samples to be collected comprise the true location where the samples are collected, e.g. longitude, latitude and height. Usually, it's center of grid. The true location may be retrieved from GPS. The measurement samples for generating signatures and the measurements for comparison with signatures comprise one or more of the followings:

1. Time that the measured information is received or created.
2. The cell Ids that are detected by the UE. Usually, they are unique cell IDs of all samples in the grid.
3. Quantized signal strength measurement, with respect to multiple cells, performed by the UE. Usually, it's the mean of the signal strength of all samples with respect to one cell.
4. Beam direction index that are detected by UE. In 5G NR, it includes ssb-Index and csi-rs-index; ssb-Index is the SS/PBCH (Synchronzation Signal/Physical Broadcast Channel) block index associated with the measurement information to be reported, csi-rs-index is CSI-RS (Channel State Information-Reference Signal) resource index associated with the measurement information to be reported.
5. Quantized signal strength measurement, with respect to beam direction index, performed by the UE. Usually, it's the mean of the signal strength of all samples with respect to one beam direction index in one cell.
6. Quantized Timing Advance (TA), in each grid point. Note, an associated ID of the cell may also be needed.
7. Angle of Arrival (AoA) and Angle of departure (AoD) measured by networks.
8. Angle of Arrival (AoA) and Angle of departure (AoD) measured by UE.

The measurement samples can be collected in one or more of offline data collection, online data collection and network data collection (via Minimization of Drive Test (MDT)).

Offline Data Collection is to collect the data by means of drive test with test suite (e.g. TEMS®). The test suite records the radio measurements together with the true-location where the measurements are collected.

In a first case, test devices are (or are configured) to behave like commercial devices (the target group of the positioning system), the intra-frequency measurements and inter-frequency measurements reporting from the devices are mostly coordinated by the RAN as a result of mobility/traffic management, rather than positioning.

In a second case, test devices are (or are configured) to be more powerful so as be able to record intra-frequency measurements and inter-frequency measurements as long as these measurements are measurable.

The differences in terms of intra-frequency measurements between the above two cases are minor under a common radio planning situation, but the difference in terms of inter-frequency measurements can be big between the above two cases. Therefore, the intra-frequency measurements will not be differentiated and will be referred as "intra-frequency measurements" in both cases, while the inter-frequency measurements will be referred as "nature inter-frequency measurements" in the first case indicating that measurements are collected based on non-positioning event and "compulsory inter-frequency measurements" indicating that measurements are collected based on positioning request.

Online Data Collection is to collect the radio measurements during e.g. 3GPP LCS Control Plane high accuracy (e.g. A-GPS (Global Positioning System)/A-GNSS (Global Navigation Satellite System)) positioning in a live network. The radio measurements are requested and recorded together with the high accurate positioning result from e.g. A-GNSS positioning.

The measurements collected in Online Data Collection procedure can include "intra-frequency measurements" and commonly "natural inter-frequency measurements".

With the LPPa (LTE Positioning Protocol A) or NRPPa (NR Positioning Protocol A) extensions described below, the location server may specify the frequencies that inter-frequency measurements shall include.

Network Data Collection is to leverage the radio feature of MDT/RDT (Remote Drive Test), that the RAN can order the UEs to report the radio measurements together with the locations from standalone GNSS. MDT procedure provides an easy and efficient way to gather huge fingerprint training signatures databases, since the MDT procedure allows collecting user experienced coverage and service quality related information associated with detailed location from GNSS receiver, see 3GPP TR 36.805 and 3GPP TS 37.320.

The radio measurements from MDT can include one or more of: "intra-frequency measurements"; "natural inter-frequency measurements" which tied to the event (corresponding to the mobility/traffic management) triggered measurements; "compulsory inter-frequency measurements" which tied to the periodic triggered measurements—that the RAN periodically orders the measurement report from UE.

After the reference data collection, training can be applied to generate the fingerprinting signatures. Assume there're N frequencies (carriers) $F_1, F_2, \ldots, F_N$, deployed in the network, per network planning. The following is an exemplary fingerprinting signature generation method.

Divide the geographic area of interest into grids. The collected reference measurements distribute among the grids and there're zero or one or more measurements in each grid.

Assume:
A) There're measurements from M unique serving cells $SC_{x1}, SC_{x2}, \ldots, SC_{xM}$, in a certain grid x.
B) For measurements from a certain serving cell $SC_{xi}$ of frequency $F0sc_{xi}$, there're neighboring cells distributed on frequencies $F0sc_{xi}, F1sc_{xi}, \ldots, FLsc_{xi}$.

Then, for each grid and each unique serving cell $SC_{xi}$ in the grid x, generate:
A) one intra-frequency measurement signature with serving cell being $SC_{xi}$ of frequency $F0sc_{xi}$, neighboring cells from $F0sc_{xi}$, and with radio measurements of corresponding cells. The neighboring cells are selected, for example, based on signal strength or appearance probability in the serving cell. The radio measurements of corresponding cells are calculated, for example, by average.
B) one inter-frequency measurement signature for each $F1sc_{xi}, \ldots, FLsc_{xi}$ respectively, sum to total L pieces of signatures. For each inter-frequency measurement signature, with serving cell being $SC_{xi}$, of frequency $F0sc_{xi}$, neighboring cells from $Fjsc_{xi}$ (j=1, 2, ..., L), and with radio measurements of corresponding cells. The neighboring cells are selected, for example, based on signal strength or appearance probability in the serving cell and the radio measurements of corresponding cells are calculated, for example, by average.

The fingerprint training signature may contain the type of measurements, for example, "intra-frequency measurements", "natural inter-frequency measurements" and "compulsory inter-frequency measurements".

FIG. 1 is a diagram illustrating an example of measurement samples and training signatures. Measurement sample on frequency 1 and measurement sample on frequency 2 are intra-frequency measurements and are used to generate training signature on frequency 1 and training signature on frequency 2 respectively. Measurement sample that serving cell on freq 1 and neighboring cell on freq 2 and measurement sample that serving cell on freq 2 and neighboring cell on freq 1 are inter-frequency measurements and are used to generate training signature that serving cell on freq 1 and neighboring cell on freq 2 and training signature that serving cell on freq 2 and neighboring cell on freq 1.

Figure 2:
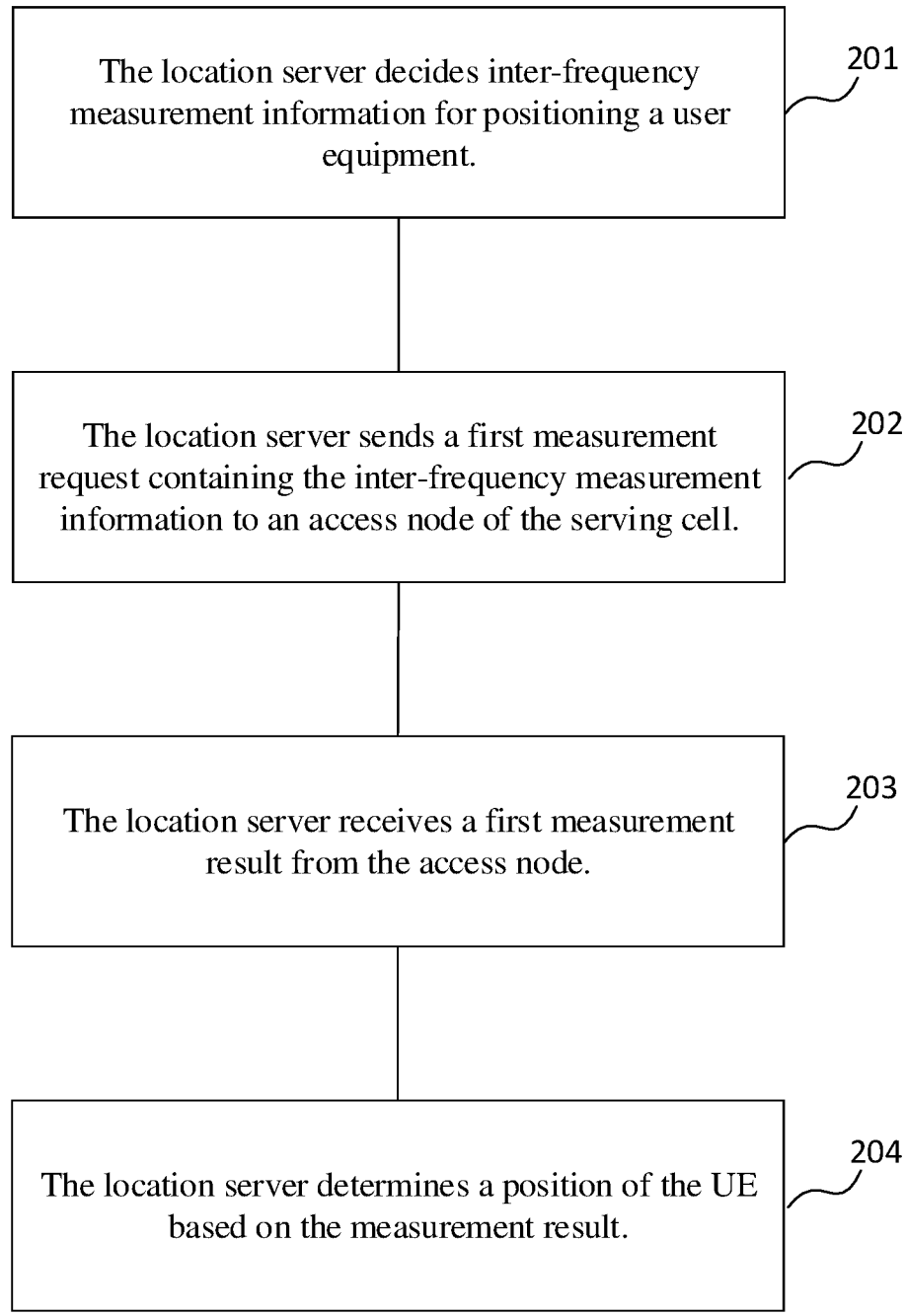
FIG. 2 is a flowchart illustrating an exemplary method 200 implemented at a location server.

FIG. 2 is a flowchart illustrating an exemplary method 200 implemented at a location server. The location server can be an E-SMLC (Evolved Serving Mobile Location Center), LMF (Location Management Function), and so on.

As shown in FIG. 2, at step 201, the location server decides inter-frequency measurement information for positioning a user equipment, UE. Note that the location server can also decide to measure frequency of serving cell and/or intra-frequency of neighboring cells. The inter-frequency measurement information comprises at least one frequency other than the frequency of the serving cell of the UE.

That is, in our invention, inter-frequency measurements are involved for positioning UE. Specifically, the location server can decide which frequency or frequencies ("Measurement Quantities EARFCN item" in table 1 and table 2 below) other than the frequency of the serving cell of the UE should be measured. The location server can select one or more frequencies from frequency candidates based on operator configuration, UE's capability to support multi radio frequency, positioning accuracy requirement, or appearance probabilities of the frequencies in the serving cell. For example, the operator can configure that certain frequencies should be measured in certain cell or in certain area. The appearance probability of a frequency in the serving cell can be determined from data in the location database. If the appearance probability of a frequency is high, the location server tends to request measuring the frequency. Specifically, for one certain cell or certain area, all the training signatures in this certain cell or certain area are found, the heard frequencies are found in these signatures. These heard frequencies are sorted according to appearance probabilities. The location server can select the heard frequencies with the highest appearance probabilities for inter-frequency measurements. If the positioning accuracy requirement is high, e.g., above certain threshold, the location server tends to request measuring more frequencies. If the UE can support multi radio frequency, the location server tends to request measuring more frequencies. Of course, the location server can request inter-frequency measurements on all applicable frequencies.

When requesting the inter-frequency measurements, the location server may further decide if it needs: Nature inter-frequency measurements, or Compulsory inter-frequency measurements, or both. That is, the inter-frequency measurement information may comprise a first indication indicating that measurements should be collected based on non-positioning event or a second indication indicating that measurements should be collected based on positioning request.

In one embodiment, the inter-frequency measurement information may comprise a number of the at least one frequency ("Measurement Quantities EARFCN" in table 1 and table 2 below) and/or a number of neighboring cells of each of the at least one frequency ("Number of cells" in table 1 and table 2 below).

The frequency candidates can be obtained for example in the following two ways.

In the first way, the location server receives a location request containing an identifier of the serving cell from a mobility management node, for example, a Mobility Management Entity (MME). The location request may be LCS-AP Location Request (3GPP TS29.171). Thus, the serving cell of the UE is identified. For one certain cell or certain area (covering several cells), all the training signatures in this certain cell or certain area are found in the location database, the heard frequencies are found in these signatures. These heard frequencies can be associated with the serving cell or serving area for use as the frequency candidates. These heard frequencies can be sorted according to appearance probabilities in the serving cell or serving area. The location server can retrieve these heard frequencies from the location database and select some or all of the candidate frequencies for inter-frequency measurements.

In the second way, the location server may firstly initiate an intra-frequency measurement process. If the positioning result is not satisfying, for example, if the accuracy of positioning does not meet the requirement, the process of the present invention is introduced.

Specifically, the location server sends a measurement request for intra-frequency measurement to the access node. The access node for example may be a base station, an eNodeB, a gNodeB, etc. The location server receives a measurement result from the access node and determines a preliminary position of the UE based on the measurement result. If the preliminary position is not accurate enough or the heard cells are not enough, the location server can identify a certain serving area from the preliminary position. As mentioned above, the certain serving area is associated with some heard frequencies as candidate frequencies. The location server can retrieve these heard frequencies from the location database and select some or all of the candidate frequencies for inter-frequency measurements.

As shown in FIG. 2, at step 202, the location server sends a first measurement request containing the inter-frequency measurement information to an access node of the serving cell.

As stated above, the inter-frequency measurement information may contain at least one frequency other than a frequency of a serving cell of the UE, i.e., the selected inter-frequencies of neighboring cells, and may further contain a number of the at least one frequency and/or a number of neighboring cells of each of the at least one frequency, and may further contain a first indication indicating that measurements should be collected based on non-positioning event or a second indication indicating that measurements should be collected based on positioning request.

In an embodiment, the first measurement request is a LPPa E-CID Measurement Initiation Request or a NRPPa E-CID Measurement Initiation Request.

Of course, the first measurement request can also contain the intra-frequency measurement information requesting the access node for intra-frequency measurement from neighboring cells. Moreover, the first measurement request can request measurement of frequency of the serving cell.

As shown in FIG. 2, at step 203, the location server receives a first measurement result from the access node. In one embodiment, the first measurement result is received via a LPPa E-CID Measurement Initiation Response or a NRPPa E-CID Measurement Initiation response. The first measurement result comprises measurements for some or all of the at least one frequency, because the access node can also adjust the number of inter-frequencies to be measured and sometimes the number of measurements reported by the UE may be less than what is expected or required in the inter-frequency measurement information. In one embodiment, the measurements are marked with cell of the inter-frequency and/or a third indication indicating whether the measurements are collected based on non-positioning event (Nature inter-frequency measurements) or the measurements are collected based on positioning request (Compulsory inter-frequency measurements).

At step 204, the location server determines a position of the UE based on the measurement result.

In fingerprinting method, the measurement result is compared with the corresponding signatures in location database. The positions (grid) associated with the most similar signatures contribute to the position of the UE.

For intra-frequency measurement, the intra similarity between the intra-frequency measurement and signatures in the location database is calculated.

For each inter-frequency measurement, the inter similarity between the inter-frequency measurement and signature of the same frequency is calculated. As mentioned above, in one embodiment, the inter-frequency measurements are marked with cell of the inter-frequency. Thus, the cell presence of the inter-frequency measurement on certain frequency may also be used in the inter similarity calculation as a penalty item. In another embodiment, the inter-frequency measurements are marked with a third indication indicating whether the measurements are collected based on non-positioning event (Nature inter-frequency measurements) or the measurements are collected based on positioning request (Compulsory inter-frequency measurements). Thus, the matching of the characteristics of the inter-frequency measurement, i.e., "nature inter-frequency measurements" or "compulsory inter-frequency measurements" may also be used in the inter similarity calculation.

The location server may compute the final similarity for each grid considering a combination of: the similarity of the intra-frequency measurement and the similarities of each inter-frequency measurement on each concerned frequency as well as other factors involved in measurements and signatures. Other factors may include signal strength of frequency of the serving cell, beam direction index, quantized signal strength measurement, with respect to beam direction index, quantized Timing Advance, angle of arrival (AoA) and angle of departure (AoD) as mentioned above. The final similarity d(n) may be the Euclidean distance, Mahalanobis distance (MaD) or Kullback-leibler Divergence (KLD).

The following is an example of Euclidean distance implementation of intra-frequency similarity d(n), which is introduced here to help understanding of the similarity calculation.

$$d(n) = \sqrt{[\Sigma_i(s_i - t_i(n))^2 + \Sigma_j(s_j - \max)^2 + \Sigma_k(l_{\max} - t_k(n))^2]/M} \quad (1)$$

Wherein, $s_i$ is the signal strength of the measurement sample s on the $i^{th}$ cell, $t_i(n)$ is the signal strength of the $n^{th}$ fingerprint training signature on the same cell i. The first summation is taken over the hearable cells that are found in both measurement sample s and the $n^{th}$ fingerprint signature. The second summation term represents the penalty term for those cells that are hearable in the measurement sample s but not in the $n^{th}$ fingerprint signature. Correspondingly, the third summation term defines the penalty term for those cells that are hearable in the $n^{th}$ fingerprint signature, but not in measurement sample s. $l_{max}$ represents the missing signal level values. M is the sum of number of i, number of j, number of k.

In this example, only signal strength and cell Id are involved. Of course, TA, AoA and AoD as well as other factors can also be involved in the formula. For inter-frequency measurement, d(n) can be modified to include more items.

Then, N similar training signatures can be found with the smallest d(n). Taking WKNN (Weighted K Nearest Neighbor) algorithm as an example, the estimated position EstPos is given by:

$$EstPos = \sum_{n=1}^{N} (w(n) * P(n)) \quad (2)$$

Wherein P(n) is the position of the $n^{th}$ fingerprint signature. w(n) is given by $$w(n) = \frac{\frac{1}{d(n)}}{\sum_{n=1}^{N} \frac{1}{d(n)}}. \quad (3)$$

Figure 3:
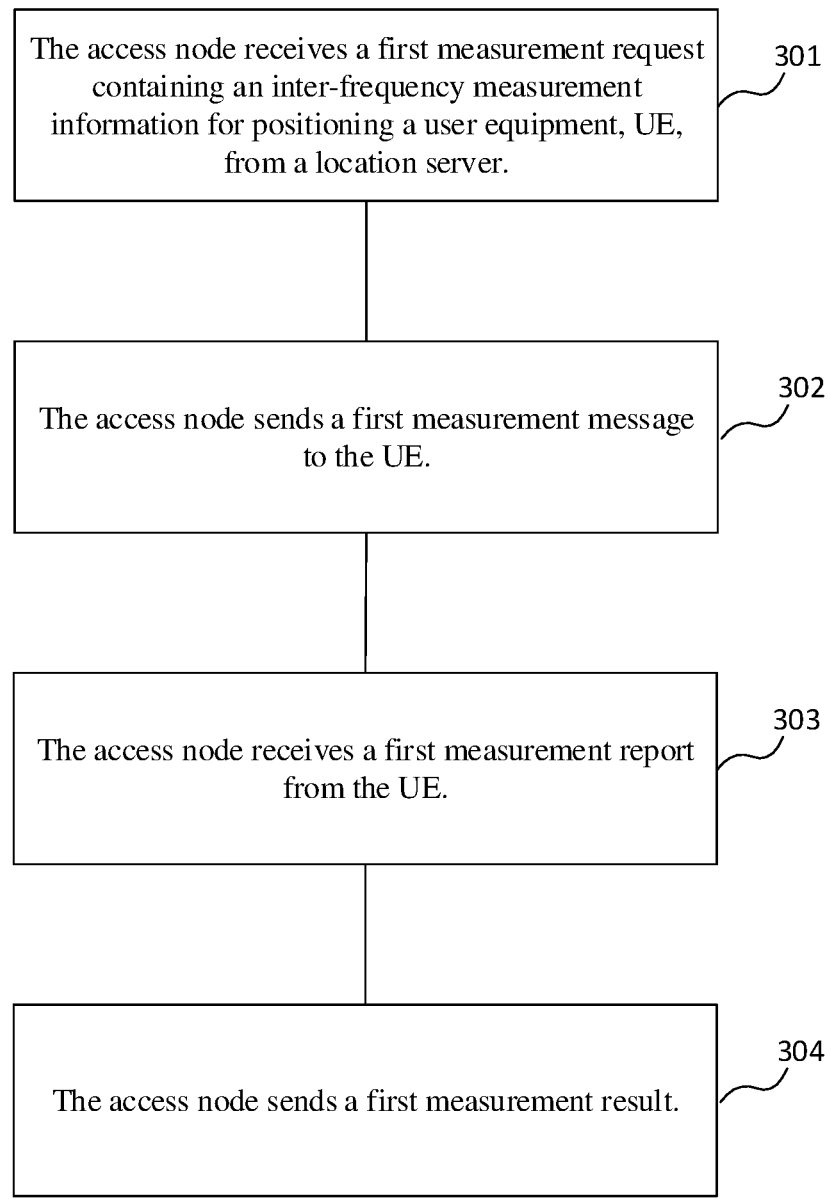
FIG. 3 is a flowchart illustrating an exemplary method 300 implemented at an access node.

FIG. 3 is a flowchart illustrating an exemplary method 300 implemented at an access node. The access node may be a base station, an eNodeB, a gNodeB, etc.

As shown in FIG. 3, at step 301, the access node receives a first measurement request containing an inter-frequency measurement information for positioning a user equipment, UE, from a location server, wherein the inter-frequency measurement information comprises at least one frequency other than a frequency of a serving cell of the UE.

In one embodiment, the inter-frequency measurement information further comprises a number of the at least one frequency.

In one embodiment, the inter-frequency measurement information further comprises a number of neighboring cells of each of the at least one frequency.

In one embodiment, the inter-frequency measurement information further comprises a first indication indicating that measurements should be collected based on non-positioning event or a second indication indicating that measurements should be collected based on positioning request.

At step 302, the access node sends a first measurement message to the UE, for example, a RRC Connection Reconfiguration message.

In the present invention, the access node can also decide whether to support full or a subset from the frequency list requested by location server and configure the UE to report intra-/inter-frequency measurement. That is, the access node can adjust the inter-frequency measurement information received from the location server. For example, the access node can select some or all of the at least one frequency specified in the inter-frequency measurement information based on network status and UE status, and the first measurement message contains the selected frequencies.

At step 303, the access node receives a first measurement report from the UE.

If a number of neighboring cells associated with the first measurement report is less than the corresponding number of neighboring cells contained in the inter-frequency measurement information and the UE reports measurements periodically, the access node sends a first measurement result based on the first measurement report to the location server at step 304. Then, the access node receives a third measurement report from the UE, wherein the third measurement report contains some of the at least one frequency that are different from those contained in the first measurement message. Thus, the number of neighboring cells measured can be increased. The access node sends a third measurement result based on the third measurement report to the location server.

If the number of neighboring cells associated with the first measurement report is less than the corresponding number of neighboring cells contained in the inter-frequency measurement information, the access node sends a second measurement message to the UE, wherein the second measurement message contains some of the at least one frequency that are different from those contained in the first measurement message and receives a second measurement report from the UE. The access node sends a first measurement result based on the first measurement report and the second measurement report to the location server at step 304.

In one embodiment, the first measurement result comprises measurements for some or all of the at least one frequency, depending on the adjustment of access node and/or the UE report received.

In one embodiment, the measurements are marked with cell of the frequency.

In one embodiment, the measurements are marked with a third indication indicating whether the measurements are collected based on non-positioning event or the measurements are collected based on positioning request.

Figure 4:
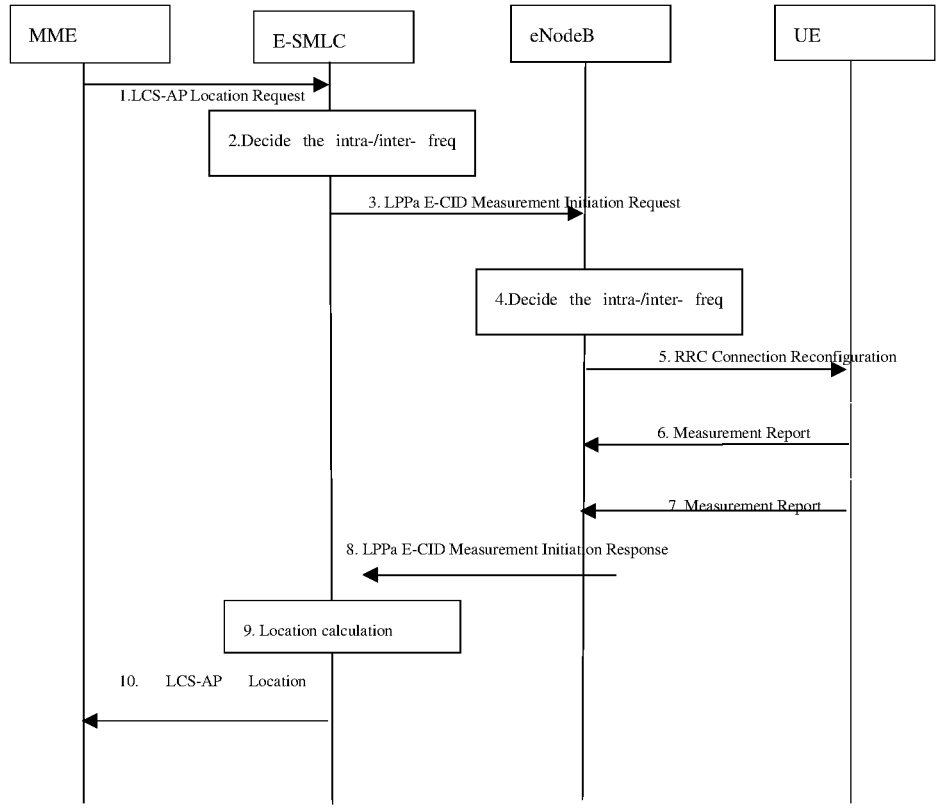
FIG. 4 shows the active positioning procedures in LTE scenario in accordance with the present invention.

FIG. 4 shows the active positioning procedures in LTE scenario in accordance with the present invention. The location server is E-SMLC and the access node is eNB.

1. The MME sends LCS-AP Location Request (3GPP TS29.171) to E-SMLC requesting the location estimation of the UE.
2. The E-SMLC decides to request intra-frequency measurements and/or inter-frequency measurements as described in step 201. E-SMLC can get the serving cell from LCS-AP Location Request which is sent from MME to E-SMLC.
3. The E-SMLC sends the LPPa E-CID Measurement Initiation Request to eNB, indicating the desired intra-frequency and/or inter-frequency measurements, as described in step 202. For inter-frequency measurements, needed frequencies can be specified. In addition, E-SMLC can set "number of cells" indicating the number of inter-frequencies required.

For active positioning, LPPa extensions (highlighted) are added to support the present invention. E-SMLC can specify which EARFCN(s) are expected to measure.

LPPa E-CID Measurement Initiation Request (3GPP TS 36.455 v15.0.0)

TABLE 1

| IE/Group Name | Presence | Range | IE type and reference | Semantics description | Criticality | Assigned Criticality |
|---|---|---|---|---|---|---|
| Message Type | M | | 9.2.3 | | YES | reject |
| LPPa Transaction ID | M | | 9.2.4 | | — | |
| E-SMLC Measurement ID | M | | INTEGER (1 . . . 15, . . . ) | | YES | reject |
| Report Characteristics | M | | ENUMERATED (OnDemand, Periodic, . . . ) | | YES | reject |
| Measurement Periodicity | C- if Report-Characteristics- Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) | | YES | reject |

TABLE 1-continued

| IE/Group Name | Presence | Range | IE type and reference | Semantics description | Criticality | Assigned Criticality |
|---|---|---|---|---|---|---|
| Measurement Quantities | | 1 . . . <maxnoMeas> | | | EACH | reject |
| >Measurement Quantities Item | M | | ENUMERATED (Cell-ID, Angle of Arrival, Timing Advance Type 1, Timing Advance Type 2, RSRP, RSRQ, . . . ) | | — | — |
| Measurement Quantities EARFCN | | 0 . . . <maxnoEARFCN> | | | | |
| > Measurement Quantities EARFCN item | M | | ARFCN-ValueEUTRA | | | |
| >Number of cells | O | | | | | |
| Inter-RAT Measurement Quantities | | 0 . . . <maxnoMeas> | | | EACH | ignore |
| >Inter-RAT Measurement Quantities Item | M | | ENUMERATED (GERAN, UTRAN, . . . ) | | | |
| WLAN Measurement Quantities | | 0 . . . <maxnoMeas> | | | EACH | ignore |
| >WLAN Measurement Quantities Item | M | | ENUMERATED (WLAN, . . . ) | | | |

"Measurement Quantities EARFCN" represents the number of inter-frequencies to be measured. "maxnoEARFCN" represents the max number of inter-frequencies. "Measurement Quantities EARFCN item" represents which inter-frequencies are specified to be measured. "Number of cells" represents how many cells should be measured with the specified inter-frequencies.

4. Taking the request from E-SMLC, eNB further decides the intra-frequency and inter-frequency measurements it will order from the UE, which may consider if the network status and UE status can fully support the measurements requested from E-SMLC or any adjustment shall be made, as described in step 301.
5. After eNB decides, eNB sends RRC Connection Reconfiguration messages to the UE, ordering the corresponding intra-frequency and/or inter-frequency measurements, as described in step 302.
6. UE reports the intra-frequency measurements to eNB when applicable.
7. UE reports the inter-frequency measurements to eNB when applicable.
8. eNB reports the intra-frequency and inter-frequency measurements to E-SMLC, as described in step 304. In case UE has reported less cells than indicated by IE (information element) "number of cells", eNB may start more inter-frequency measurements if measurements were not started on all frequencies (repeat the above steps 4-7). In case of periodic reports, eNB doesn't need to start more inter-frequency measurements when UE has reported less cells than indicated by IE "number of cells".
9. E-SMLC calculates the location estimation based on the received measurements as described in step 204, and Step 2-Step 9 may be repeated according to the E-SMLC strategy. The exemplary location calculation algorithm is described in the step 204 above.
10. E-SMLC sends the final location estimate to MME.

Figure 5:
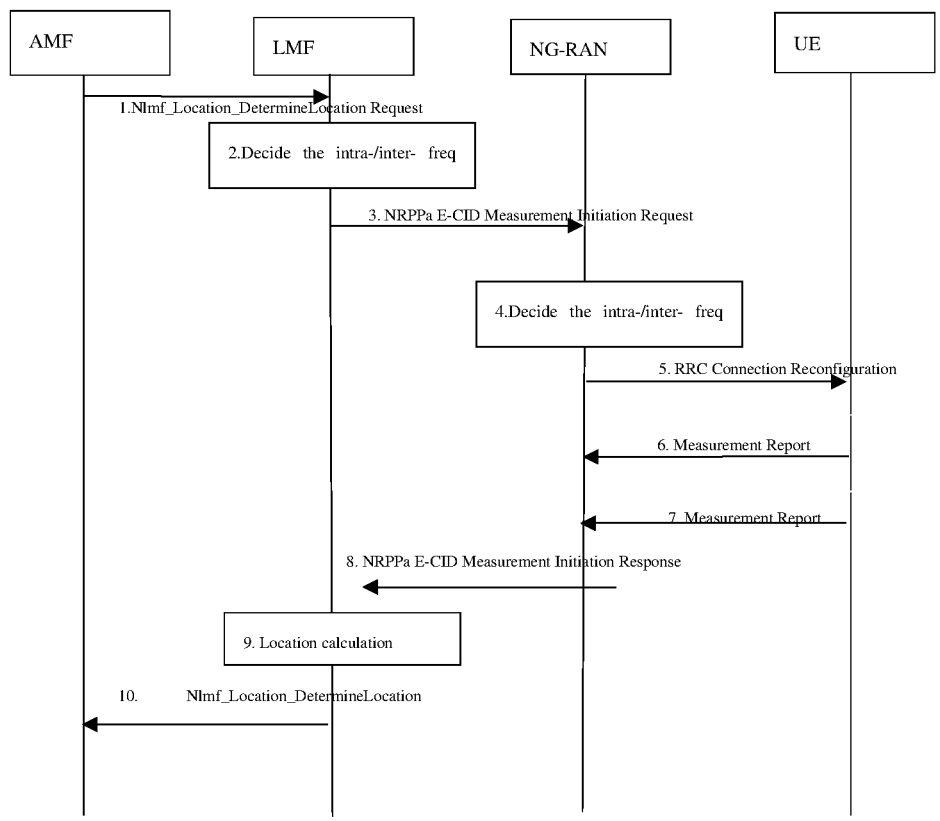
FIG. 5 shows the active positioning procedures in 5G scenario in accordance with the present invention.

FIG. 5 shows the active positioning procedures in 5G scenario in accordance with the present invention. The location server is AMF and the access node is NG-RAN (gNB).

1. The AMF sends Nlmf_Location_DetermineLocation Request to LMF requesting the location estimation of the UE.
2. The LMF decides to request intra-frequency measurements and/or inter-frequency measurements, as described in step 201.
3. The LMF sends the NRPPa E-CID Measurement Initiation Request to NG-RAN, indicating the desired intra-frequency and inter-frequency measurements as described in step 202. For inter-frequency measurements, needed frequencies can be specified. In addition, LMF can set "number of cells".

Below NRPPa extensions (highlighted) are added to support the idea. LMF can specify which EARFCN(s) are expected to measure.

NRPPa E-CID Measurement Initiation Request (3GPP TS 38.455v15.0.0)

TABLE 2

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| LMF UE Measurement ID | M | | INTEGER (1 . . . 15, . . . ) | | YES | reject |

TABLE 2-continued

| IE/Group Name | Presence | Range | IE type and reference | Semantics description | Criticality | Assigned Criticality |
|---|---|---|---|---|---|---|
| Report Characteristics | M | | ENUMERATED (OnDemand, Periodic, . . . ) | | YES | reject |
| Measurement Periodicity | C-ifReport-Characteristics-Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) | | YES | reject |
| Measurement Quantities | | 1 . . . <maxnoMeas> | | | EACH | reject |
| >Measurement Quantities Item | M | | ENUMERATED (Cell-ID, Angle of Arrival, Timing Advance Type 1, Timing Advance Type 2, RSRP, RSRQ, . . . ) | | — | — |
| Measurement Quantities EARFCN | | 0 . . . <maxnoEARFCN> | | | | |
| > Measurement Quantities EARFCN item | M | | ARFCN-ValueEUTRA | | | |
| >Number of cells | | | | | | |
| Other-RAT Measurement Quantities | | 0 . . . <maxnoMeas> | | | EACH | ignore |
| >Other-RAT Measurement Quantities Item | M | | ENUMERATED (GERAN, UTRAN , . . . ) | | | |
| WLAN Measurement Quantities | | 0 . . . <maxnoMeas> | | | EACH | ignore |
| >WLAN Measurement Quantities Item | M | | ENUMERATED (WLAN, . . . ) | | | |

4. Taking the request from LMF as described in step 301, NG-RAN further decides the intra-frequency and inter-frequency measurements it will order from the UE, which may consider if the network status and UE status can fully support the measurements requested from NR-RAN or any adjustment shall be made.
5. After NG-RAN decides, NG-RAN sends RRC Connection Reconfiguration messages to the UE, ordering the corresponding intra-frequency and/or inter-frequency measurements, as described in step 302.
6. UE reports the intra-frequency measurements to NG-RAN when applicable.
7. UE reports the inter-frequency measurements to NG-RAN when applicable.
8. NG-RAN reports the intra-frequency and inter-frequency measurements to LMF, as described in step 304.

In case UE has reported less cells than indicated by IE "number of cells", gNB may start more inter-frequency measurements if measurements where not started on all frequencies (repeat the above steps 4-7).

In case of periodic reports, gNB doesn't need to start more inter-frequency measurements when UE has reported less cells than indicated by IE "number of cells".

9. LMF calculates the location estimation based on the received measurements as described in step 204, and step 2-step 9 may be repeated. The exemplary location calculation algorithm is described in the step 204 above.
10. LMF sends the final location estimate to AMF.

The above described LTE case and 5G case are both for active positioning scenario. Active positioning uses an on-demand location query mechanism to actively retrieve the location of specific device(s) in the network. Typical use cases include, for example: Emergency Positioning, Non-frequent periodic tracking, (Objects/People) "Finder" service. The Control Plane positioning architecture and signaling flow for active positioning is considered well defined in 3GPP for GERAN (2G), UTRAN(3G), E-UTRAN (4G) and NR-RAN (on-going) respectively—for example, TS22.071 and TS 23.271 is the stage 1 and stage 2 service description for LCS (Location Service); TS 25.305, TS36.305 and TS38.305 is stage 2 functional description for UE positioning in UTRAN, E-UTRAN and NR-RAN respectively. For the active positioning, the inter-frequency or intra-frequency or both of them can be indicated in the request message from E-SMLC or LMF or location server to 5G NR, LTE eNodeB, 3G RAN, etc. Furthermore, the frequency lists shall be indicated in the request message.

The present invention can also be applied to passive positioning. RAN passive positioning refers to the case that the passive locations are calculated based on the events from radio network, which may include e.g. RRC messages. Passive positioning is to passively receive various events for a defined set or all subscribers/devices from nodes like PS/EPS (MSC/SGSN/MME), RAN (OSS) in the mobile network, and derive the locations of these subscribers/devices from the events. And it worth to mention, the events here are not specifically and necessarily for positioning purpose but are triggered by normal user activities in the network, e.g. attach/detach, handover etc., which enables an "always-on" effect as the events are continuously generated if the subscribers/devices are connected to the network.

Typical use cases for passive positioning include, for example: Large scale apps, Mobility analytics, Smart city & urban planning, Footfall analysis, Mobile advertisement, Geofencing services, Location-based alerts, etc. Compared to the events from core network which (usually) merely contain serving cell ID of the subscriber/device that contributes to the location estimation, the events from radio network may contain richer information including neighbor cells, signal strength, timing advance where positioning methods like Enhanced Cell ID or the fingerprinting positioning as described above apply to generate a more accurate location estimation.

Different from active positioning, no standard architecture or signaling flow has been defined for passive positioning. However, given the attractive use cases that passive positioning is supposed to support, almost all network equipment vendors have been active in the domain and offer vendor specific solution, which normally leverages the monitoring, performance management functions in the corresponding nodes.

For the passive positioning, the inter-frequency or intra-frequency or both of them can be indicated in the configuration message from location server to 5G NR, LTE eNodeB, 3G RAN, etc.

After the data training, the location server is ready to take the positioning traffic. The interface between the location server to the LCS Client and RAN is usually vendor specific and the format depends on the vendor design, which can be e.g. streaming based, file based etc.

1. A LCS Client sends location request to the location server asking for/subscribing to the location update from massive UEs.
2. The location server decides to request intra-frequency measurements and/or inter-frequency measurements, as described in step 201.
3. The location server sends the configuration messages to RAN which may be 5G NR, LTE, WCDMA or other RAN, or proxied via other vendor specific node e.g. OSS, as described in step 202. The configuration message indicates the desired intra-frequency and inter-frequency measurements. In addition, the Location Server can indicate "number of cells".
4. Taking the configurations from E-SMLC as described in step 301, RAN further decides the intra-frequency and inter-frequency measurements it will order from the UEs, which may consider if the network status can fully support the measurements requested from E-SMLC or any adjustment shall be made.
5. RAN may reply to the location server whether the configuration is successful and how the final configurations look like.
6. RAN sends RRC Connection Reconfiguration or alike messages to the UEs, ordering the corresponding intra-frequency and/or inter-frequency measurements, as described in step 302.
7. UEs report the intra-frequency measurements to RAN when applicable.
8. UEs report the inter-frequency measurements to RAN when applicable.
9. RAN reports the intra-frequency and inter-frequency measurements to the location server, as described in step 304. For inter-frequency measurement, RAN may further indicate if the measurements are "natural inter-frequency measurements" or "compulsory inter-frequency measurements".

In case UE has reported less cells than indicated by IE "number of cells", eNB may start more inter-frequency measurements if measurements where not started on all frequencies (repeat steps 4 and 7).

10. The location server calculates the location estimates based on the received measurements. The exemplary location calculation algorithm is described in step 204 above.
11. The location server sends the location estimates to the LCS Client. Step 2-step 11 run continuously usually until the LCS Client stop subscribing the location updates or error happens.

The advantages of the present invention include:

Better positioning accuracy by an optimal hybrid of intra-frequency measurements and inter-frequency measurements in fingerprinting positioning method.

Higher positioning yield rate by an optimal hybrid of intra-frequency measurements and inter-frequency measurements in fingerprinting positioning method.

Efficient and optimal system behavior when requesting the intra-frequency measurements and/or inter-frequency measurements, where location server can make a request (proposal) and RAN can make the final decision by considering the location server's request and the radio situation.

Extension in the interface between the location server and RAN makes above negotiation possible.

The various blocks shown in FIG. 2 and FIG. 3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
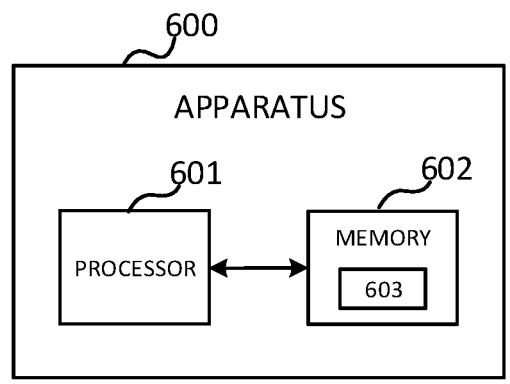
FIG. 6 is a block diagram illustrating an apparatus 600 according to some embodiments of the present disclosure.

FIG. 6 is a block diagram illustrating an apparatus 600 according to some embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a location server as described with respect to FIG. 2.

In some implementations, the one or more memories 602 and the computer program codes 603 may be configured to, with the one or more processors 601, cause the apparatus 600 at least to perform any operation of the method as described in connection with FIG. 2. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
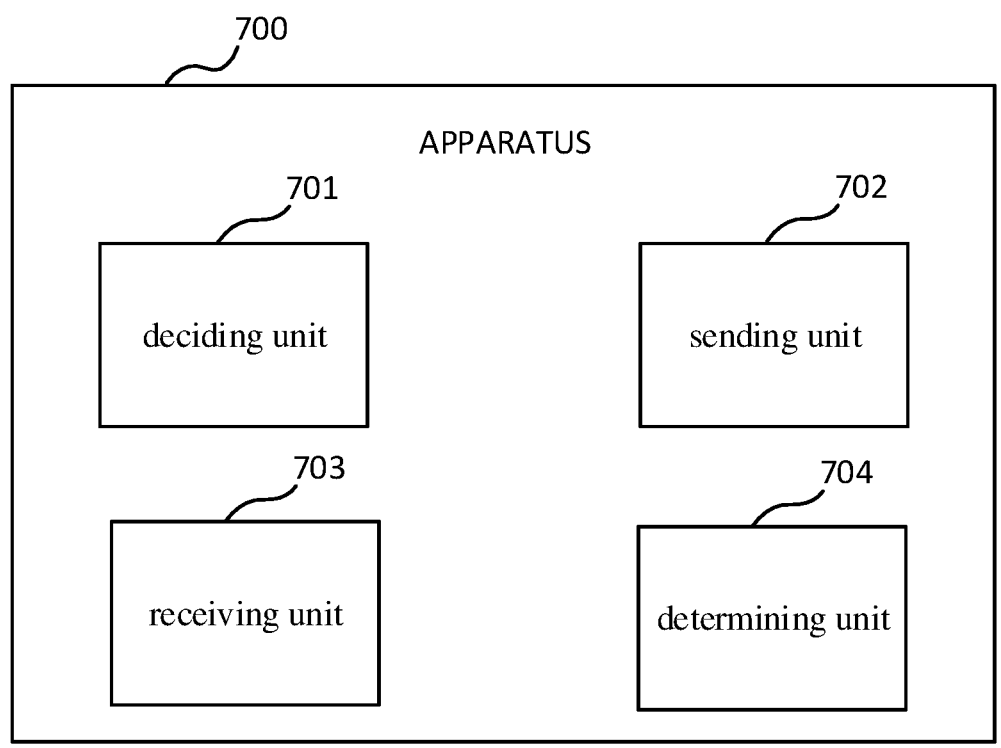
FIG. 7 is a block diagram illustrating an apparatus 700 according to some embodiments of the present disclosure.

FIG. 7 is a block diagram illustrating an apparatus 700 according to some embodiments of the present disclosure. As shown in FIG. 7, the apparatus 700 may comprise a deciding unit 701, a sending unit 702, a receiving unit 703 and a determining unit 704. In an exemplary embodiment, the apparatus 700 may be implemented in a network node such as a location server. The deciding unit 701 may be operable to carry out the operation in block 201, the sending unit 702 may be operable to carry out the operation in block 202, the receiving unit 703 may be operable to carry out the operation in block 203, and the determining unit 704 may be operable to carry out the operation in block 204. Optionally, the deciding unit 701, the sending unit 702, the receiving unit 703 and/or the determining unit 704 may be operable to carry out more or less operations to implement the proposed methods according to the exemplary embodiments of the present disclosure.

Figure 8:
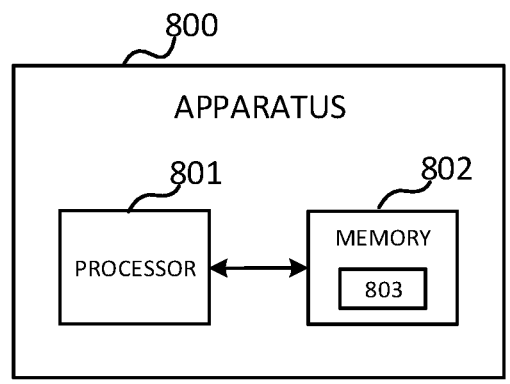
FIG. 8 is a block diagram illustrating an apparatus 800 according to some embodiments of the present disclosure.

FIG. 8 is a block diagram illustrating an apparatus 800 according to some embodiments of the present disclosure. As shown in FIG. 8, the apparatus 800 may comprise one or more processors such as processor 801 and one or more memories such as memory 802 storing computer program codes 803. The memory 802 may be non-transitory machine/processor/computer readable storage medium. In accordance with some exemplary embodiments, the apparatus 800 may be implemented as an integrated circuit chip or module that can be plugged or installed into an access node as described with respect to FIG. 3.

In some implementations, the one or more memories 802 and the computer program codes 803 may be configured to, with the one or more processors 801, cause the apparatus 800 at least to perform any operation of the method as described in connection with FIG. 3. Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Figure 9:
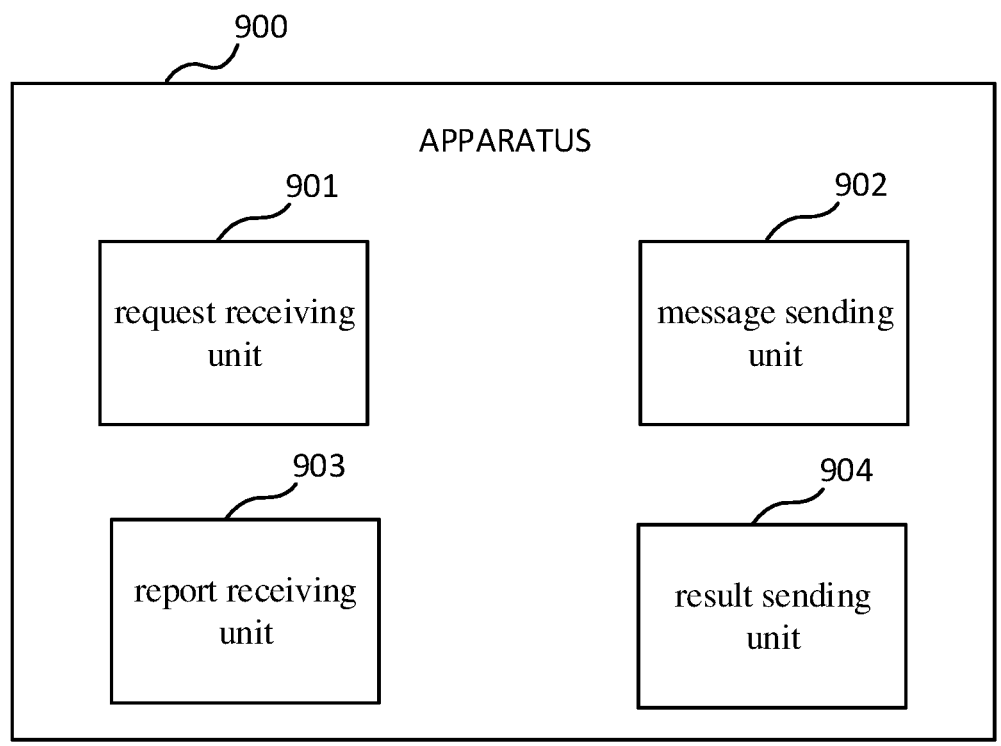
FIG. 9 is a block diagram illustrating an apparatus 900 according to some embodiments of the present disclosure.

FIG. 9 is a block diagram illustrating an apparatus 900 according to some embodiments of the present disclosure. As shown in FIG. 9, the apparatus 900 may comprise a request receiving unit 901, a message sending unit 902, a report receiving unit 903 and a result sending unit 904. In an exemplary embodiment, the apparatus 900 may be implemented in a network node such as an access node. The request receiving unit 901 may be operable to carry out the operation in block 301, the message sending unit 902 may be operable to carry out the operation in block 302, the report receiving unit 903 may be operable to carry out the operation in block 303, and the result sending unit 904 may be operable to carry out the operation in block 304. Optionally, the request receiving unit 901, the message sending unit 902, the report receiving unit 903 and/or the result sending unit 904 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a location server, the method comprising:
    deciding inter-frequency measurement information for positioning a user equipment, UE, the inter-frequency measurement information comprising:
        at least one frequency in a cell that is different from a serving cell of the UE, for inter-frequency measurements; and
        one or both of a first indication indicating that the inter-frequency measurements should be collected based on a non-positioning event corresponding to a mobility/traffic management and a second indication indicating that compulsory periodically triggered inter-frequency measurements should be collected based on a positioning request for positioning the UE;
    sending a first measurement request containing the inter-frequency measurement information to an access node of the serving cell;
    receiving a first measurement result from the access node, the first measurement result comprising inter-frequency measurements for a plurality or all of the at least one frequency in the cell that is different from of the serving cell of the UE, the measurements being marked with the cell that is different from the serving cell of the UE and a third indication indicating whether the measurements are collected based on the non-positioning event or whether the measurements are collected based on the positioning request; and determining a position of the UE based on the first measurement result, determining the position of the UE based on the first measurement result comprising:
calculating similarities between measurements in the first measurement result and corresponding signatures recorded in a location database; and
determining the position of the UE based on the calculated similarities.

2. The method of claim 1, wherein the inter-frequency measurement information further comprises a number of the at least one frequency and a number of neighboring cells of each of the at least one frequency.

3. The method of claim 1, further comprising:
receiving a location request containing an identifier of the serving cell from a mobility management node;
retrieving a first set of frequencies associated with the serving cell from a location database;
wherein the deciding inter-frequency measurement information step comprises: selecting a plurality or all of the first set of frequencies as the at least one frequency.

4. The method of claim 3, wherein the selecting step is performed based on operator configuration, UE's capability to support multi radio frequency, positioning accuracy requirement, or appearance probabilities of the frequencies in the serving cell.

5. The method of claim 1, further comprising:
sending a measurement request for the frequency of the serving cell to the access node;
receiving a second measurement result from the access node;
determining a preliminary position of the UE based on the second measurement result;
retrieving a second set of frequencies associated with the preliminary position from a location database;
wherein the deciding inter-frequency measurement information step comprises: selecting a plurality or all of the second set of frequencies as the at least one frequency.

6. The method of claim 1, wherein the first measurement request comprises a LPPa E-CID Measurement Initiation Request or a NRPPa E-CID Measurement Initiation Request and the first measurement result is received via a LPPa E-CID Measurement Initiation Response or a NRPPa E-CID Measurement Initiation response.

7. An apparatus implemented in a location server, the apparatus comprising:
one or more processors; and
one or more memories comprising computer program codes,
the one or more memories and the computer program codes configured to, with the one or more processors, cause the apparatus at least to:
decide inter-frequency measurement information for positioning a user equipment, UE, the inter-frequency measurement information comprises comprising:
at least one frequency in a cell that is different from a serving cell of the UE, for inter-frequency measurements; and
one or both of a first indication indicating that the inter-frequency measurements should be collected based on a non-positioning event corresponding to a mobility/traffic management and a second indication indicating that compulsory periodically triggered inter-frequency measurements should be collected based on a positioning request for positioning the UE;
send a first measurement request containing the inter-frequency measurement information to an access node of the serving cell;
receive a first measurement result from the access node, the first measurement result comprising inter-frequency measurements for a plurality or all of the at least one frequency in the cell that is different from the serving cell of the UE, and the measurements are marked with the cell that is different from the serving cell of the UE and a third indication indicating whether the measurements are collected based on the non-positioning event or whether the measurements are collected based on the positioning request; and
determine a position of the UE based on the first measurement result, determining the position of the UE based on the first measurement result comprising:
calculating similarities between measurements in the first measurement result and corresponding signatures recorded in a location database; and
determining the position of the UE based on the calculated similarities.

8. The apparatus of claim 7, wherein the one or more memories and the computer program codes are configured to, with the one or more processors, cause the apparatus to:
receive a location request containing an identifier of the serving cell from a mobility management node; and
retrieve a first set of frequencies associated with the serving cell from a location database;
wherein the deciding inter-frequency measurement information step comprises: selecting a plurality or all of the first set of frequencies as the at least one frequency.

* * * * *